US008619179B2

(12) United States Patent  
Imai (10) Patent No.: US 8,619,179 B2  
(45) Date of Patent: Dec. 31, 2013

(54) MULTI-MODAL IMAGE CAPTURE APPARATUS WITH A TUNABLE SPECTRAL RESPONSE

(75) Inventor: Francisco Imai, Mountain View, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 380 days.

(21) Appl. No.: 13/073,634

(22) Filed: Mar. 28, 2011

(65) Prior Publication Data

US 2012/0249819 A1 Oct. 4, 2012

(51) Int. Cl.
*H04N 5/225* (2006.01)

(52) U.S. Cl.
USPC .......................................... 348/342; 348/340

(58) Field of Classification Search
None
See application file for complete search history.

(56) References Cited

U.S. PATENT DOCUMENTS

| | | | |
|---|---|---|---|
| 3,609,010 A | 9/1971 | Mueller | |
| 7,035,484 B2 | 4/2006 | Silberberg et al. | |
| 7,055,986 B2 | 6/2006 | Littleton | |
| 7,554,586 B1 | 6/2009 | Imai et al. | |
| 7,792,423 B2 | 9/2010 | Raskar et al. | |
| 7,949,252 B1* | 5/2011 | Georgiev | 396/334 |
| 8,228,417 B1* | 7/2012 | Georgiev et al. | 348/340 |
| 2002/0012064 A1* | 1/2002 | Yamaguchi | 348/362 |
| 2007/0081182 A1* | 4/2007 | Shiohara | 358/1.13 |
| 2008/0131019 A1 | 6/2008 | Ng | |
| 2010/0265385 A1 | 10/2010 | Knight et al. | |
| 2011/0128412 A1* | 6/2011 | Milnes et al. | 348/231.99 |

OTHER PUBLICATIONS

Zaraga et al., "White balance by tunable spectral responsivities", Journal of Optical Society of America, Jan. 2010.*
Longoni et al., "The Transverse Field Detector (TFD): A Novel Color-Sensitive Cmos Device," IEEE Electron Device Letters, vol. 29, No. 12, Dec. 2008.*
K. Hirakawa, et al., "Spatio-spectral color filter array design for enhanced image fidelity", Proc. of ICIP, 2007.
A. Longoni, et al., "The transverse field detector (TFD): A novel color-sensitive CMOS device", IEEE Electron Device Letters 29, pp. 1306-1308, 2008.
U.S. Appl. No. 12/859,115, filed Aug. 18, 2010, Applicant: Francisco Imai.
U.S. Appl. No. 13/029,076, filed Feb. 16, 2011, Applicant: Francisco Imai.
U.S. Appl. No. 12/949,566, filed Nov. 18, 2010, Applicant: Francisco Imai.
U.S. Appl. No. 12/949,592, filed Nov. 18, 2010, Applicant: Francisco Imai.
R. Horstmeyer et al., "Modified light field architecture for reconfigurable multimode imaging," Proc. SPIE 7468, 746804, 2009.
Ren Ng et al., "Light Field Photography with a Hand-held Plenoptic Camera", Stanford Tech Report CTSR Feb. 2005.

(Continued)

*Primary Examiner* — Nelson D. Hernández Hernández
*Assistant Examiner* — Dennis Hogue
(74) *Attorney, Agent, or Firm* — Fitzpatrick, Cella, Harper & Scinto (57) ABSTRACT

An image capture apparatus includes an image sensor which has a tunable spectral response and which is tunable in accordance with a capture mask to capture multi-spectral image data. Light-field optics are arranged to project light-field information of a scene onto the image sensor.

24 Claims, 8 Drawing Sheets

(56) References Cited

OTHER PUBLICATIONS

Chan et al., "A Spectral Analysis for Light Field Rendering", Proceedings 2000 International Conference on Image Processing, vol. 2, 2000.

Hirsch et al., "BiDi Screen: A Thin, Depth-Sensing LCD for 3D Interaction Using Light Fields", ACM Transactions on Graphics, vol. 28, No. 9, 2009.

Georgiev et al., "Unified Frequency Domain Analysis of Lightfield Cameras", ECCV '08 Proceedings of the 10th European Conference on Computer Vision: Part III, 2008.

Liang et al., "Programmable Aperture Photography: Multiplexed Light Field Acquisition", ACM Transactions on Graphics, vol. 27, No. 3, 2008.

Liang et al, "Light Field Acquisition Using Programmable Aperture Camera", Proceedings of IEEE Int'l Conference on Image Processing, 2007.

Horstmeyer et al., "Flexible Multimodal Camera Using a Light Field Architecture", IEEE Conf. on Computational Photography, 2009.

\* cited by examiner

MULTI-MODAL IMAGE CAPTURE APPARATUS WITH A TUNABLE SPECTRAL RESPONSE

FIELD

The present disclosure relates to light-field photography and multi-spectral image capture.

BACKGROUND

Light-field photography captures a four-dimensional light field in a single photographic exposure. The light field is "four-dimensional" since it captures information in two spatial dimensions and two angular dimensions. Post-processing of the light field allows synthesis of images not possible with ordinary photography, such as images with focus that varies, aperture that varies, perspective that varies, and the like.

Multi-spectral image capture refers to the capture of spectral information with a relatively high number of spectral components. Ordinary RGB image capture is capable of capturing three spectral bands for each pixel, and thus each pixel has three spectral components. Multi-spectral image capture is capable of capturing four or more spectral bands for each pixel, such as capture of blue, green, yellow, orange and red channels for each pixel. In such an example, each pixel has five components.

SUMMARY

The disclosure herein contemplates multi-modal image capture in which there is a multi-spectral capture of light-field information.

One method to combine multi-spectral information with light-field information might include using a multi-aperture system in combination with a color filter array (CFA). However, such a combination requires sampling of different color channels either temporally or spatially. Temporal multi-band color channel sampling requires multiple captures over time, limiting its application to static objects. Spatial multi-band color channel sampling, on the other hand, significantly reduces spatial resolution and requires complex demosaicing algorithms which produce artifacts.

The foregoing situation is addressed by providing a light-field image capture of multi-spectral image data by an image sensor which has a tunable spectral response and which is tunable in accordance with a capture mask.

Thus, in an example embodiment described herein, an image capture apparatus includes an image sensor which has a tunable spectral response and which is tunable in accordance with a capture mask to capture multi-spectral image data. Light-field optics are arranged to project light-field information of a scene onto the image sensor.

By providing a light-field image capture of multi-spectral image data by an image sensor which has a tunable spectral response and which is tunable in accordance with a capture mask, it is ordinarily possible to efficiently capture both multi-spectral image data and light-field information. Moreover, the spectral response of the image sensor can be tailored to the particular scene being captured, e.g., to reduce noise from unwanted colors.

This brief summary has been provided so that the nature of this disclosure may be understood quickly. A more complete understanding can be obtained by reference to the following detailed description and to the attached drawings.

DETAILED DESCRIPTION

In the following example embodiments, there is described a mulit-spectral digital camera which may be a digital still camera or a digital video camera. It is understood, however, that the following description encompasses arbitrary arrangements which can incorporate or utilize multi-spectral imaging assemblies having a spectral response which is tunable in accordance with a capture parameter, for instance, a data processing apparatus having an image sensing function (e.g., a personal computer) or a portable terminal having an image sensing function (e.g., a mobile telephone).

Figure 1A:
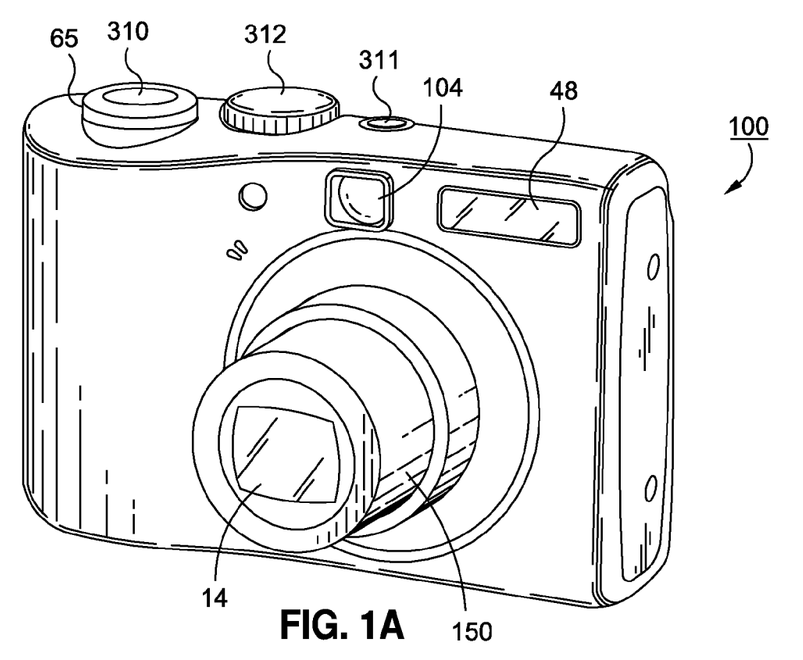
FIGS. 1A and 1B are views depicting an external appearance of an image capture device according to an example embodiment.
Figure 1B:
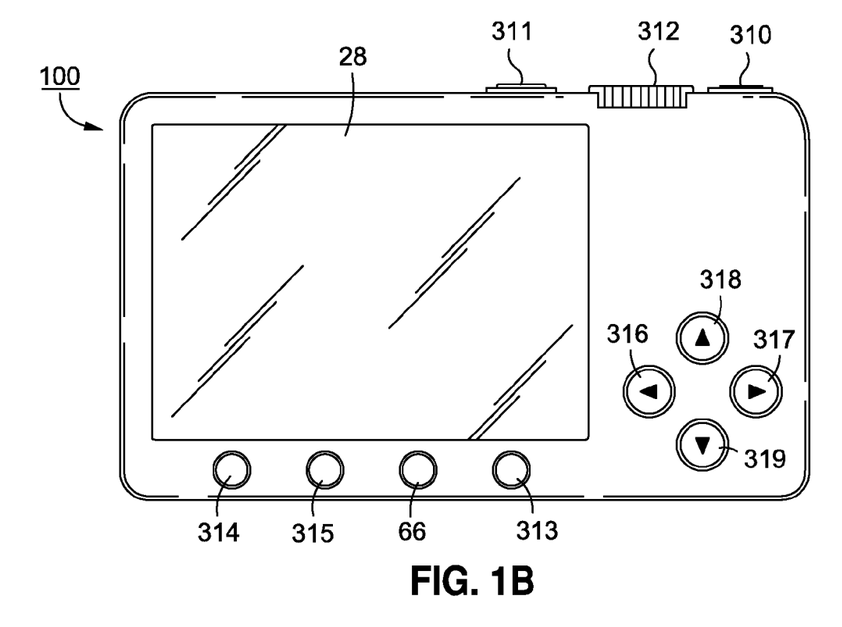

FIGS. 1A and 1B are views showing an example of an external appearance of an image capture device 100 according to an example embodiment. Note in these figures, some components are omitted for conciseness. A user operates buttons and switches for turning ON/OFF the power of the digital camera 100, for setting, changing or confirming the shooting parameters, for confirming the status of the camera, for confirming shot images, and so on.

Optical finder 104 is a viewfinder, through which a user can view a scene to be captured. In this embodiment optical finder 104 is separate from image display unit 28, but in some embodiments image display unit 28 may also function as a viewfinder.

Flash (flash emission device) 48 is for emitting auxiliary light to illuminate a scene to be captured, if necessary.

Image sensor 14 is an image sensor which converts an optical image into an electrical signal. In this embodiment, image sensor 14 is a multi-spectral image sensor with a spectral response which is tunable in accordance with a capture mask to capture multi-spectral image data. Image sensor 14 will be described more fully below with respect to FIG. 2A.

The power button 311 is provided to start or stop the digital camera 100, or to turn ON/OFF the main power of the digital camera 100. The menu button 314 is provided to display the setting menu such as shooting parameters and operation modes of the digital camera 100, and to display the status of the digital camera 100. The menu includes selectable items or items whose values are variable.

A delete button 313 is pressed for deleting an image displayed on a playback mode or a shot-image confirmation screen. In the present embodiment, the shot-image confirmation screen (a so-called quick review screen) is provided to display a shot image on the image display unit 28 immediately after shooting for confirming the shot result. Furthermore, the present embodiment is constructed in a way that the shot-image confirmation screen is displayed as long as a user keeps pressing the shutter button 310 after the user instructs shooting by shutter button depression.

An enter button 315 is pressed for selecting a mode or an item. When the enter button 315 is pressed, a system controller 50 sets the mode or item selected at this time. The display ON/OFF button 66 is used for selecting displaying or non-displaying of photograph information regarding the shot image, and for switching the image display unit 28 to be functioned as an electronic view finder.

A left button 316, a right button 317, an up button 318, and a down button 319 may be used for the following purposes, for instance, changing an option (e.g., items, images) selected from plural options, changing an index position that specifies a selected option, and increasing or decreasing numeric values (e.g., correction value, date and time).

Half-stroke of the shutter button 310 instructs the system controller 50 to start, for instance, AF processing, AE processing, AWB processing, EF processing or the like. Full-stroke of the shutter button 310 instructs the system controller 50 to perform shooting.

The zoom operation unit 65 is operated by a user for changing the angle of view (zooming magnification or shooting magnification).

A recording/playback selection switch 312 is used for switching a recording mode to a playback mode, or switching a playback mode to a recording mode. Note, in place of the above-described operation system, a dial switch may be adopted or other operation systems may be adopted.

Figure 2A:
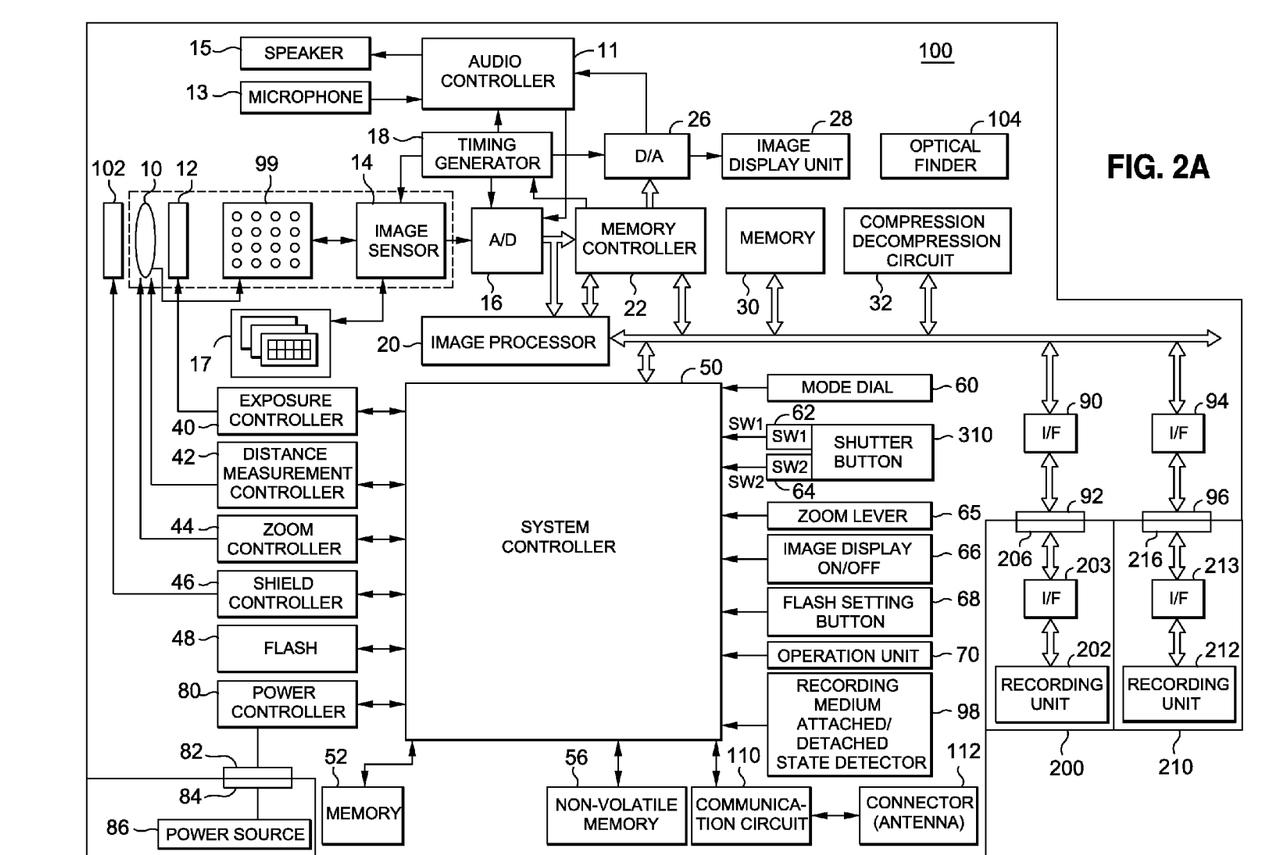
FIGS. 2A and 2B are detailed block diagrams for explaining the internal architecture of the image capture device shown in FIG. 1 according to an example embodiment.

FIG. 2A is a block diagram showing an example of the arrangement of the multi-spectral digital camera 100 as an image capture device according to this embodiment. Referring to FIG. 2A, reference numeral 10 denotes an imaging lens; 12, a shutter having an aperture function; and 14, an image sensor which has a spectral response which is tunable in accordance with a capture parameter, and which converts an optical image into an electrical signal. In FIG. 2A, an imaging assembly is comprised of image sensor 14 and associated optics, such that in some embodiments the imaging assembly is comprised of image sensor 14 and lens 10. Reference numeral 16 denotes an A/D converter which converts an analog signal into a digital signal. The A/D converter 16 is used when an analog signal output from the image sensor 14 is converted into a digital signal and when an analog signal output from an audio controller 11 is converted into a digital signal. Reference numeral 102 denotes a shield, or barrier, which covers the image sensor including the lens 10 of the digital camera 100 to prevent an image capturing system including the lens 10, shutter 12, and image sensor 14 from being contaminated or damaged.

Light-field information gathering unit 99 captures light-field information. Light-field information gathering unit 99 might comprise light-field optics arranged to project light-field information of a scene onto image sensor 14. Examples of such optics include multi-aperture optics, polydioptric optics, and a plenoptic system. Light-field information differs from simple image data in that image data is merely a two-dimensional representation of the total amount of light at each pixel of an image, whereas light-field information also includes information concerning the directional lighting distribution at each pixel. In some usages, light-field information is sometimes referred to as four-dimensional. In the present embodiment, the array of lenses or other hardware for light-field information gathering unit 99 may be arranged on top of each tunable pixel (or groups thereof), and different apertures of the different lenses may be managed in units of super-pixels, as discussed more fully below.

In the present embodiment, imaging lens 10, shutter 12, image sensor 14 and light-field information gathering unit 99 function together to act as a light-field gathering assembly which gathers light-field information of a scene in a single capture operation.

Optical system 10 may be of a zoom lens, thereby providing an optical zoom function. The optical zoom function is realized by driving a magnification-variable lens of the optical system 10 using a driving mechanism of the optical system 10 or a driving mechanism provided on the main unit of the digital camera 100.

A light beam (light beam incident upon the angle of view of the lens) from an object that goes through the imaging lens (image sensing lens) 10 passes through an opening of the shutter 12 having a diaphragm function, into light-field information gathering unit 99, and forms an optical image of the object on the image sensing surface of the image sensor 14. The image sensor 14 converts the optical image to analog image signals and outputs the signals to an A/D converter 16. The A/D converter 16 converts the analog image signals to digital image signals (image data). The image sensor 14 and the A/D converter 16 are controlled by clock signals and control signals provided by a timing generator 18. The timing generator 18 is controlled by a memory controller 22 and a system controller 50.

Image sensor 14 is a multi-spectral image sensor which has a spectral response (e.g., spectral responsivity) which is tunable in accordance with a capture parameter 17. The spectral responsivity for each pixel is tunable based on capture parameter, 17 such as a capture parameter in an arrayed mask of capture parameter(s) 17 arranged in correspondence to the array of pixels. Accordingly, capture parameter 17 may be applied as a grid-like spatial capture mask, for example when a shutter is half pressed. As such, spectral responses can be adjusted in accordance with capture parameters in the mask. In this embodiment, capture parameter 17 may be comprised of multiple spatial masks, with one mask each for each channel of information output by image sensor 14.

In one example, image sensor 14 may capture multi-spectral or high-resolution spectral data, i.e., may output five or more channels of color information for each pixel, including a red-like channel, a green-yellow-like channel, a green-like channel, a blue-green-like channel, and a blue-like channel. Thus, in this example, capture parameter 17 includes a spatial mask DR for the red-like channel of information, a spatial mask DGY for the green-yellow-like channel of information, a spatial mask DG for the green-like channel of information, a spatial mask DBG for the blue-green-like channel of information and a spatial mask DB for the blue-like channel of information. Each spatial mask comprises an array of control parameters corresponding to pixels or regions of pixels in image sensor 14. The spectral responsivity of each pixel, or each region of plural pixels, is thus tunable individually and independently of other pixels or regions of pixels. In that regard, image sensor 14 may be comprised of a transverse field detector (TFD) sensor, and spatial masks DR, DGY, DG, DBG and DB may correspond to voltage biases applied to control electrodes of the TFD sensor.

Further examples of aspects of tunable image sensor arrangements are described in U.S. application Ser. No.

12/949,592, filed Nov. 18, 2010, titled "Adaptive Spectral Imaging By Using An Imaging Assembly With Tunable Spectral Sensitivities", by Francisco Imai, in U.S. application Ser. No. 12/859,115, filed Aug. 18, 2010, titled "Image Capture With Identification Of Illuminant", by Francisco Imai, and in U.S. application Ser. No. 12/871,826, filed Aug. 30, 2010, titled "Image Capture With Region-Based Adjustment Of Imaging Properties", by Francisco Imai, the contents of which are incorporated by reference herein.

In the embodiment herein, the image sensor 14 is not preceded by a color filter array (CFA). In that regard, a CFA is one method to capture spectral data. An example of such a CFA is described in U.S. Pat. No. 6,226,034 (Katayama), the contents of which are incorporated by reference herein. However, the use of a CFA may lead to a number of disadvantages. For example, CFAs often have low sensitivity, so a significant amount of signals (data) can be lost. Additionally, the inclusion of any filter necessarily decreases the signal-to-noise ratio by filtering the amount of light incident on the image sensor. Moreover, implementing a CFA for each pixel can be prohibitively expensive and may not be physically possible, particularly in smaller cameras.

Reference numeral 18 denotes a timing generator, which supplies clock signals and control signals to the image sensor 14, the audio controller 11, the A/D converter 16, and a D/A converter 26. The timing generator 18 is controlled by a memory controller 22 and system controller 50. Reference numeral 20 denotes an image processor, which applies resize processing such as predetermined interpolation and reduction, and color conversion processing to data from the A/D converter 16 or that from the memory controller 22. The image processor 20 executes predetermined arithmetic processing using the captured image data, and the system controller 50 executes exposure control and ranging control based on the obtained arithmetic result.

As a result, TTL (through-the-lens) AF (auto focus) processing, AE (auto exposure) processing, and EF (flash pre-emission) processing are executed. The image processor 20 further executes predetermined arithmetic processing using the captured image data, and also executes TTL AWB (auto white balance) processing based on the obtained arithmetic result. It is understood that in other embodiments, optical finder 104 may be used in combination with the TTL arrangement, or in substitution therefor.

Output data from the A/D converter 16 is written in a memory 30 via the image processor 20 and memory controller 22 or directly via the memory controller 22. The memory 30 stores image data which is captured by the image sensor 14 and is converted into digital data by the A/D converter 16, and image data to be displayed on an image display unit 28. The image display unit 28 may be a liquid crystal screen. Note that the memory 30 is also used to store audio data recorded via a microphone 13, still images, movies, and file headers upon forming image files. Therefore, the memory 30 has a storage capacity large enough to store a predetermined number of still image data, and movie data and audio data for a predetermined period of time.

A compression/decompression unit 32 compresses or decompresses image data by adaptive discrete cosine transform (ADCT) or the like. The compression/decompression unit 32 loads captured image data stored in the memory 30 in response to pressing of the shutter 310 as a trigger, executes the compression processing, and writes the processed data in the memory 30. Also, the compression/decompression unit 32 applies decompression processing to compressed image data loaded from a detachable recording unit 202 or 212, and writes the processed data in the memory 30. Likewise, image data written in the memory 30 by the compression/decompression unit 32 is converted into a file by the system controller 50, and that file is recorded in the recording unit 202 or 212.

The memory 30 also serves as an image display memory (video memory). Reference numeral 26 denotes a D/A converter, which converts image display data stored in the memory 30 into an analog signal, and supplies that analog signal to the image display unit 28. Reference numeral 28 denotes an image display unit, which makes display according to the analog signal from the D/A converter 26 on the liquid crystal screen 28 of an LCD display. In this manner, image data to be displayed written in the memory 30 is displayed by the image display unit 28 via the D/A converter 26.

The exposure controller 40 controls the shutter 12 having a diaphragm function based on the data supplied from the system controller 50. The exposure controller 40 may also have a flash exposure compensation function by linking up with a flash (flash emission device) 48. The flash 48 has an AF auxiliary light projection function and a flash exposure compensation function.

The distance measurement controller 42 controls a focusing lens of the optical system 10 based on the data supplied from the system controller 50. A zoom controller 44 controls zooming of the optical system 10. A shield controller 46 controls the operation of a shield (barrier) 102 to protect the optical system 10.

Reference numeral 13 denotes a microphone. An audio signal output from the microphone 13 is supplied to the A/D converter 16 via the audio controller 11 which includes an amplifier and the like, is converted into a digital signal by the A/D converter 16, and is then stored in the memory 30 by the memory controller 22. On the other hand, audio data is loaded from the memory 30, and is converted into an analog signal by the D/A converter 26. The audio controller 11 drives a speaker 15 according to this analog signal, thus outputting a sound.

A nonvolatile memory 56 is an electrically erasable and recordable memory, and uses, for example, an EEPROM. The nonvolatile memory 56 stores constants, computer-executable programs, and the like for operation of system controller 50. Note that the programs include those for execution of various flowcharts.

Figure 2B:
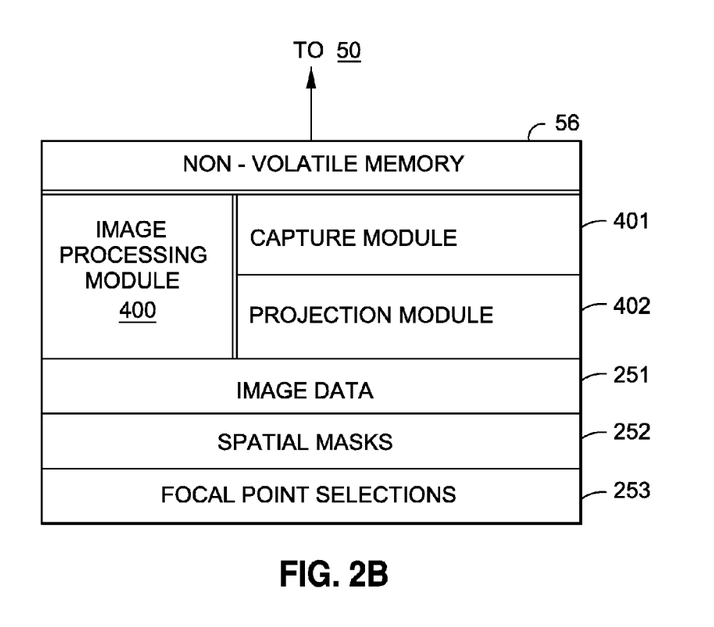

In particular, as shown in FIG. 2B, non-volatile memory 56 is an example of a non-transitory computer-readable memory medium, having retrievably stored thereon image processing module 400 as described herein. According to this example embodiment, the image processing module 400 includes at least a capture module 401 for capturing multi-spectral image data with an image sensor of the image capture apparatus. The image sensor has a tunable spectral response and which is tunable in accordance with a capture mask. Image processing module 400 further includes projection module 402 for projecting light-field information of a scene with light-field optics of the image capture apparatus. The light-field information is projected onto the image sensor. These modules will be discussed in more detail below with respect to FIG. 4.

Additionally, as shown in FIG. 2B, non-volatile memory 56 also includes image data 251, which includes image data from a scene. Non-volatile memory 56 may also store capture parameter(s) 17 for application to image sensor 14 so as to control spectral responsivity of the imaging assembly. In this embodiment, such capture parameters are stored as a capture mask in spatial masks 252, which control spectral responsivity of the image sensor so as to permit pixel-by-pixel or region-by-region control of spectral responsivity, independently of other pixels or regions. Non-volatile memory 56 may further store focal point selections 253, and the focal point selections in turn may be used to set one or more apertures for the light-field optics, as discussed more fully below. In that regard, focal point selections 253 may be used to generate a light-field spatial selection mask which is independent of the capture mask and which is used to set apertures for the light-field optics, and this light-field spatial selection mask can also be stored in spatial masks 252.

Reference numeral 50 denotes a system controller, which controls the entire digital camera 100. The system controller 50 executes programs recorded in the aforementioned nonvolatile memory 56 to implement respective processes to be described later of this embodiment. Reference numeral 52 denotes a system memory which comprises a RAM. On the system memory 52, constants and variables required to operate system controller 50, programs read out from the nonvolatile memory 56, and the like are mapped.

A mode selection switch 60, shutter switch 310, and operation unit 70 form operation means used to input various operation instructions to the system controller 50.

The mode selection switch 60 includes the imaging/playback selection switch, and is used to switch the operation mode of the system controller 50 to one of a still image recording mode, movie recording mode, playback mode, and the like.

The shutter switch 62 is turned on in the middle of operation (half stroke) of the shutter button 310 arranged on the digital camera 100, and generates a first shutter switch signal SW1. Also, the shutter switch 64 is turned on upon completion of operation (full stroke) of the shutter button 310, and generates a second shutter switch signal SW2. The system controller 50 starts the operations of the AF (auto focus) processing, AE (auto exposure) processing, AWB (auto white balance) processing, EF (flash pre-emission) processing, and the like in response to the first shutter switch signal SW1. Also, in response to the second shutter switch signal SW2, the system controller 50 starts a series of processing (shooting) including the following: processing to read image signals from the image sensor 14, convert the image signals into image data by the A/D converter 16, process the image data by the image processor 20, and write the data in the memory 30 through the memory controller 22; and processing to read the image data from the memory 30, compress the image data by the compression/decompression circuit 32, and write the compressed image data in the recording medium 200 or 210.

A zoom operation unit 65 is an operation unit operated by a user for changing the angle of view (zooming magnification or shooting magnification). The operation unit 65 can be configured with, e.g., a slide-type or lever-type operation member, and a switch or a sensor for detecting the operation of the member.

The image display ON/OFF switch 66 sets ON/OFF of the image display unit 28. In shooting an image with the optical finder 104, the display of the image display unit 28 configured with a TFT, an LCD or the like may be turned off to cut the power supply for the purpose of power saving.

The flash setting button 68 sets and changes the flash operation mode. In this embodiment, the settable modes include: auto, flash-on, red-eye reduction auto, and flash-on (red-eye reduction). In the auto mode, flash is automatically emitted in accordance with the lightness of an object. In the flash-on mode, flash is always emitted whenever shooting is performed. In the red-eye reduction auto mode, flash is automatically emitted in accordance with lightness of an object, and in case of flash emission the red-eye reduction lamp is always emitted whenever shooting is performed. In the flash-on (red-eye reduction) mode, the red-eye reduction lamp and flash are always emitted.

The operation unit 70 comprises various buttons, touch panels and so on. More specifically, the operation unit 70 includes a menu button, a set button, a macro selection button, a multi-image reproduction/repaging button, a single-shot/serial shot/self-timer selection button, a forward (+) menu selection button, a backward (−) menu selection button, and the like. Furthermore, the operation unit 70 may include a forward (+) reproduction image search button, a backward (−) reproduction image search button, an image shooting quality selection button, an exposure compensation button, a date/time set button, a compression mode switch and the like.

Figure 6A:
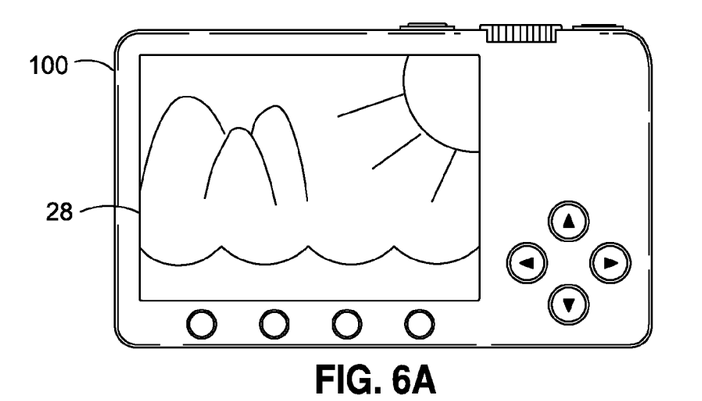
FIG. 6A is a view for explaining display of an image by the image capture device shown in FIG. 1 according to one example embodiment.
Figure 6B:
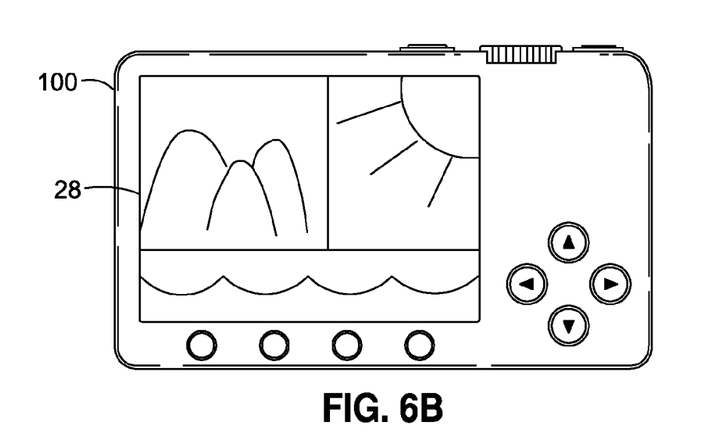
FIG. 6B is a view for explaining regions of interest according to one example embodiment.
Figure 6C:
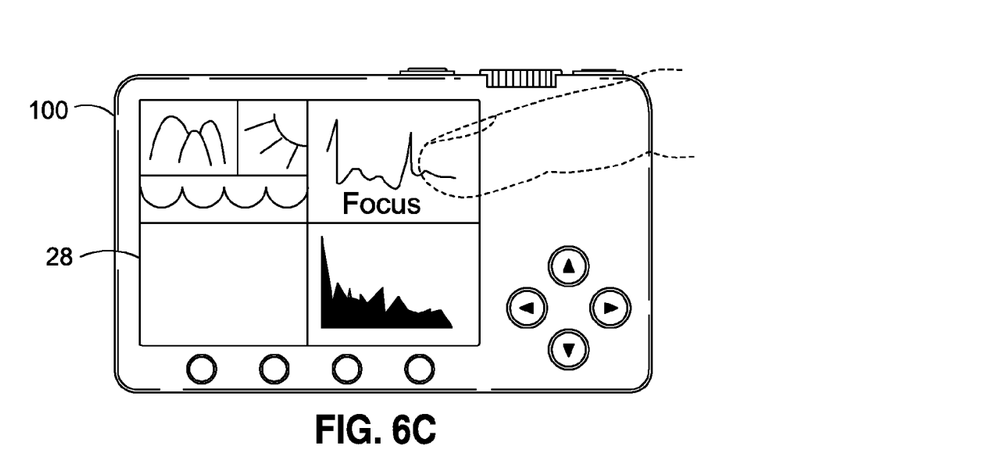
FIG. 6C is a view for explaining acceptance, by the image capture device shown in FIG. 1, of a selection of a focus for a region of interest according to one example embodiment.

In one embodiment, operation unit 70 may comprise hardware for implementing a touchscreen user interface, as shown, for example, in FIGS. 6A to 6C. Specifically, a user interface on image display unit 28 may be constructed to accept a user designation of a region of interest (ROI) in the preview image, via user manipulation of the user interface, as well as to accept a user adjustment of focus. According to one example embodiment, image display unit 28 may further display a user interface for accepting a user selection of an additional region, and a controller may affect a re-adjustment based on the additional selection. In this way, the touchscreen allows the user to dynamically select different regions of the preview image to adjust focus. Of course, the touchscreen user interface could also be used for other selections and commands.

The compression mode switch is provided for setting or selecting a compression rate in JPEG (Joint Photographic Expert Group) compression, recording in a RAW mode and the like. In the RAW mode, analog image signals outputted by the image sensing device are digitalized (RAW data) as it is and recorded.

Note in the present embodiment, RAW data includes not only the data obtained by performing A/D conversion on the photoelectrically converted data from the image sensing device, but also the data obtained by performing lossless compression on A/D converted data. Moreover, RAW data indicates data maintaining output information from the image sensing device without a loss. For instance, RAW data is A/D converted analog image signals which have not been subjected to white balance processing, color separation processing for separating luminance signals from color signals, or color interpolation processing. Furthermore, RAW data is not limited to digitalized data, but may be of analog image signals obtained from the image sensing device.

According to the present embodiment, the JPEG compression mode includes, e.g., a normal mode and a fine mode. A user of the digital camera 100 can select the normal mode in a case of placing a high value on the data size of a shot image, and can select the fine mode in a case of placing a high value on the quality of a shot image.

In the JPEG compression mode, the compression/decompression circuit 32 reads image data written in the memory 30 to perform compression at a set compression rate, and records the compressed data in, e.g., the recording medium 200.

In the RAW mode, analog image signals are read in units of line in accordance with the pixel arrangement of the color filter of the image sensor 14, and image data written in the memory 30 through the A/D converter 16 and the memory controller 22 is recorded in the recording medium 200 or 210.

Note that the digital camera 100 according to the present embodiment has a plural-image shooting mode, where plural image data can be recorded in response to a single shooting instruction by a user. Image data recording in this mode includes image data recording typified by an auto bracket mode, where shooting parameters such as white balance and exposure are changed step by step. It also includes recording of image data having different post-shooting image processing contents, for instance, recording of plural image data having different data forms such as recording in a JPEG form or a RAW form, recording of image data having the same form but different compression rates, and recording of image data on which predetermined image processing has been performed and has not been performed.

A power controller 80 comprises a power detection circuit, a DC-DC converter, a switch circuit to select the block to be energized, and the like. The power controller 80 detects the existence/absence of a power source, the type of the power source, and a remaining battery power level, controls the DC-DC converter based on the results of detection and an instruction from the system controller 50, and supplies a necessary voltage to the respective blocks for a necessary period. A power source 86 is a primary battery such as an alkaline battery or a lithium battery, a secondary battery such as an NiCd battery, an NiMH battery or an Li battery, an AC adapter, or the like. The main unit of the digital camera 100 and the power source 86 are connected by connectors 82 and 84 respectively comprised therein.

The recording media 200 and 210 comprise: recording units 202 and 212 that are configured with semiconductor memories, magnetic disks and the like, interfaces 203 and 213 for communication with the digital camera 100, and connectors 206 and 216. The recording media 200 and 210 are connected to the digital camera 100 through connectors 206 and 216 of the media and connectors 92 and 96 of the digital camera 100. To the connectors 92 and 96, interfaces 90 and 94 are connected. The attached/detached state of the recording media 200 and 210 is detected by a recording medium attached/detached state detector 98.

Note that although the digital camera 100 according to the present embodiment comprises two systems of interfaces and connectors for connecting the recording media, a single or plural arbitrary numbers of interfaces and connectors may be provided for connecting a recording medium. Further, interfaces and connectors pursuant to different standards may be provided for each system.

For the interfaces 90 and 94 as well as the connectors 92 and 96, cards in conformity with a standard, e.g., PCMCIA cards, compact flash (CF) (registered trademark) cards and the like, may be used. In this case, connection utilizing various communication cards can realize mutual transfer/reception of image data and control data attached to the image data between the digital camera and other peripheral devices such as computers and printers. The communication cards include, for instance, a LAN card, a modem card, a USB card, an IEEE 1394 card, a P1284 card, an SCSI card, and a communication card for PHS or the like.

The optical finder 104 is configured with, e.g., a TTL finder, which forms an image from the light beam that has gone through the lens 10 utilizing prisms and minors. By utilizing the optical finder 104, it is possible to shoot an image without utilizing an electronic view finder function of the image display unit 28. The optical finder 104 includes indicators, which constitute part of the display device 54, for indicating, e.g., a focus state, a camera shake warning, a flash charge state, a shutter speed, an f-stop value, and exposure compensation.

A communication circuit 110 provides various communication functions such as USB, IEEE 1394, P1284, SCSI, modem, LAN, RS232C, and wireless communication. To the communication circuit 110, a connector 112 can be connected for connecting the digital camera 100 to other devices, or an antenna can be provided for wireless communication.

A real-time clock (RTC, not shown) may be provided to measure date and time. The RTC holds an internal power supply unit independently of the power supply controller 80, and continues time measurement even when the power supply unit 86 is OFF. The system controller 50 sets a system timer using a date and time obtained from the RTC at the time of activation, and executes timer control.

Figure 3A:
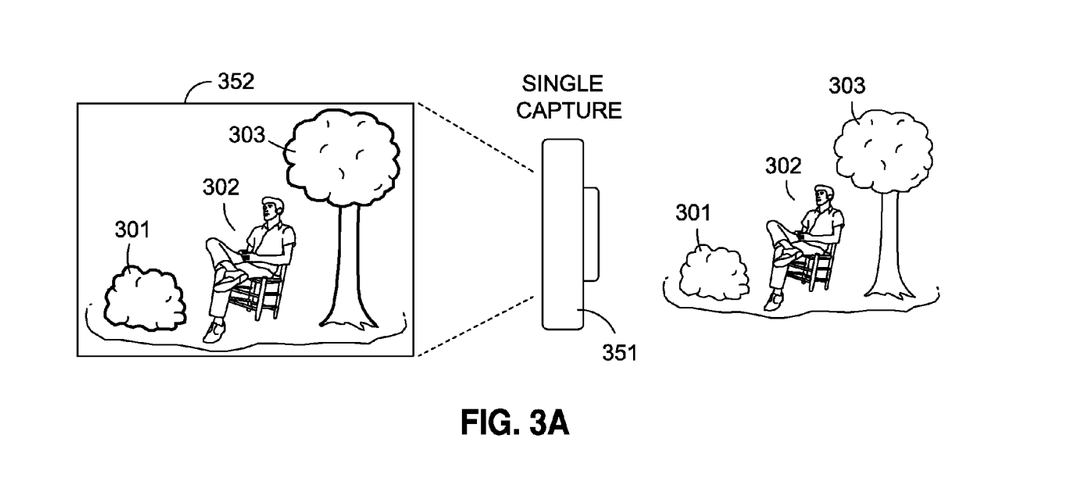
FIGS. 3A and 3B are representative views for explaining differences between simple pixel information and light-field information.
Figure 3B:
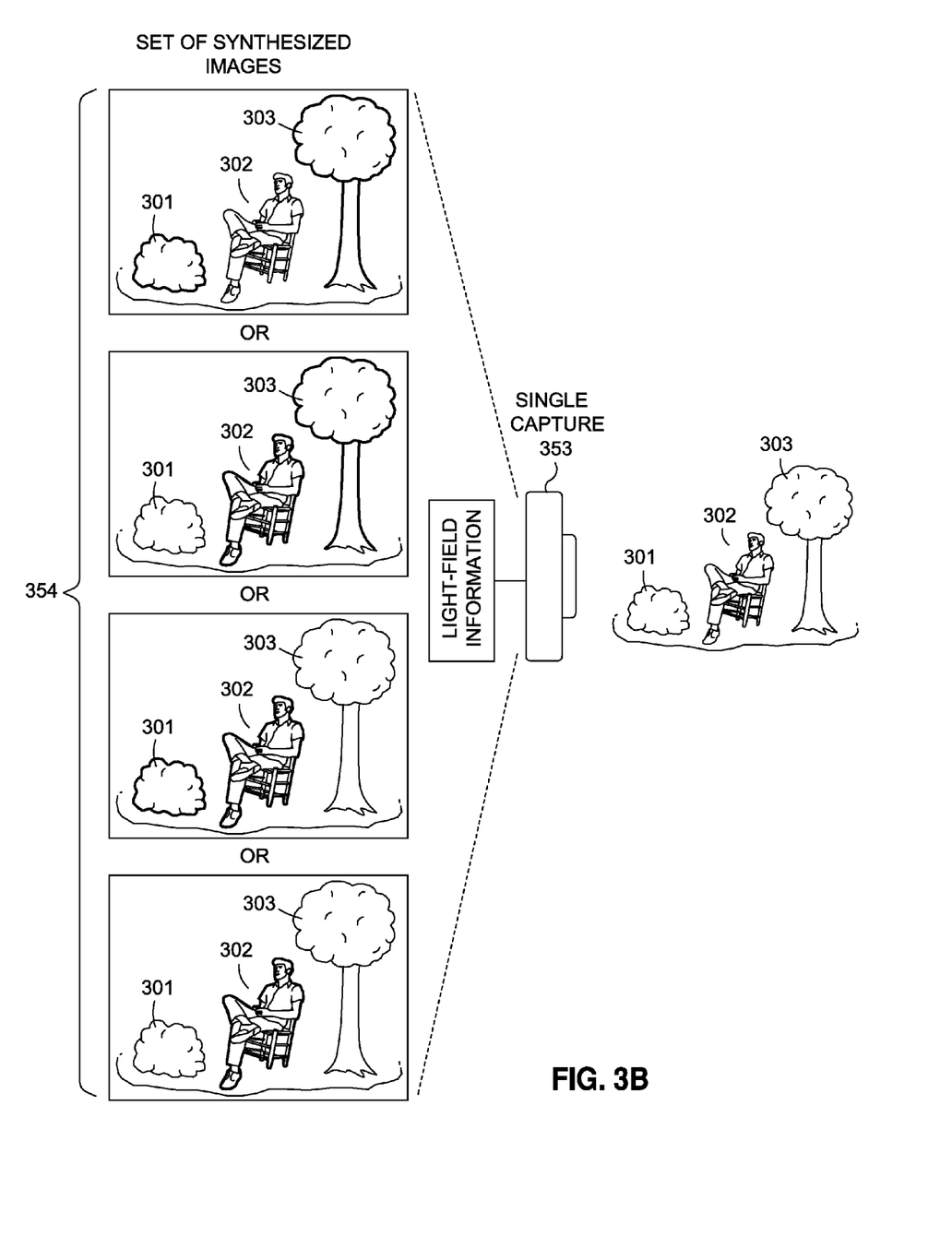

FIGS. 3A and 3B are representative views for explaining the differences between simple image data and light-field information.

In particular, as discussed above, light-field information (e.g., such as that gathered by light-field gathering unit 99) differs from simple image data in that simple image data is merely a two-dimensional representation of the total amount of light at each pixel of an image, whereas light-field information also includes information concerning the directional lighting distribution at each pixel. In some usages, light-field information is sometimes referred to as four-dimensional. Using the light-field information, images at different focus positions and from different viewpoints can be obtained from a single capture operation.

In FIGS. 3A and 3B, a thick line is used to represent a blurry part of an image, whereas a normal line is used to represent a sharp or focused part of the image.

FIG. 3A is a view for explaining focus adjustment using a simple camera 351 to capture simple image data 352. As shown in FIG. 3A, in the image data 352 captured by simple camera 351, the seated man 302 is in focus, whereas the bush 301 and the tree 303 are not. Any objects out of the focus of the seated man 302, such as bush 301 and the tree 303, appear blurry.

However, image data captured by the image capture device 100 and displayed on the image display unit 28 may include regions where the preferable focus varies widely. In such cases, adjusting the focus globally, as in FIG. 3A, may result in certain areas of the image where the focus looks incorrect or not pleasing from an aesthetic point of view.

Thus, in contrast, FIG. 3B is a view for explaining adjustment using a light-field information capture device 353 to capture light-field information 354. The light field information capture device can be used to generate a scene identical to that shown in FIG. 3A. However, since the light-field information also captures images at different focus positions and from different viewpoints, the light-field information can also be used to generate synthesized images where the bush is in focus or where the tree is in focus, all from the same single capture operation. Additionally, the light-field information can be used to construct an image in which, for example, the bush 301 and tree 303 are in focus, but the seated man 302 is not, which would be impossible with a single capture of simple image data. Moreover, objects in the same range from the device (not shown) can have different focuses. Thus, multiple different focuses can be obtained using the light-field information.

Figure 4:
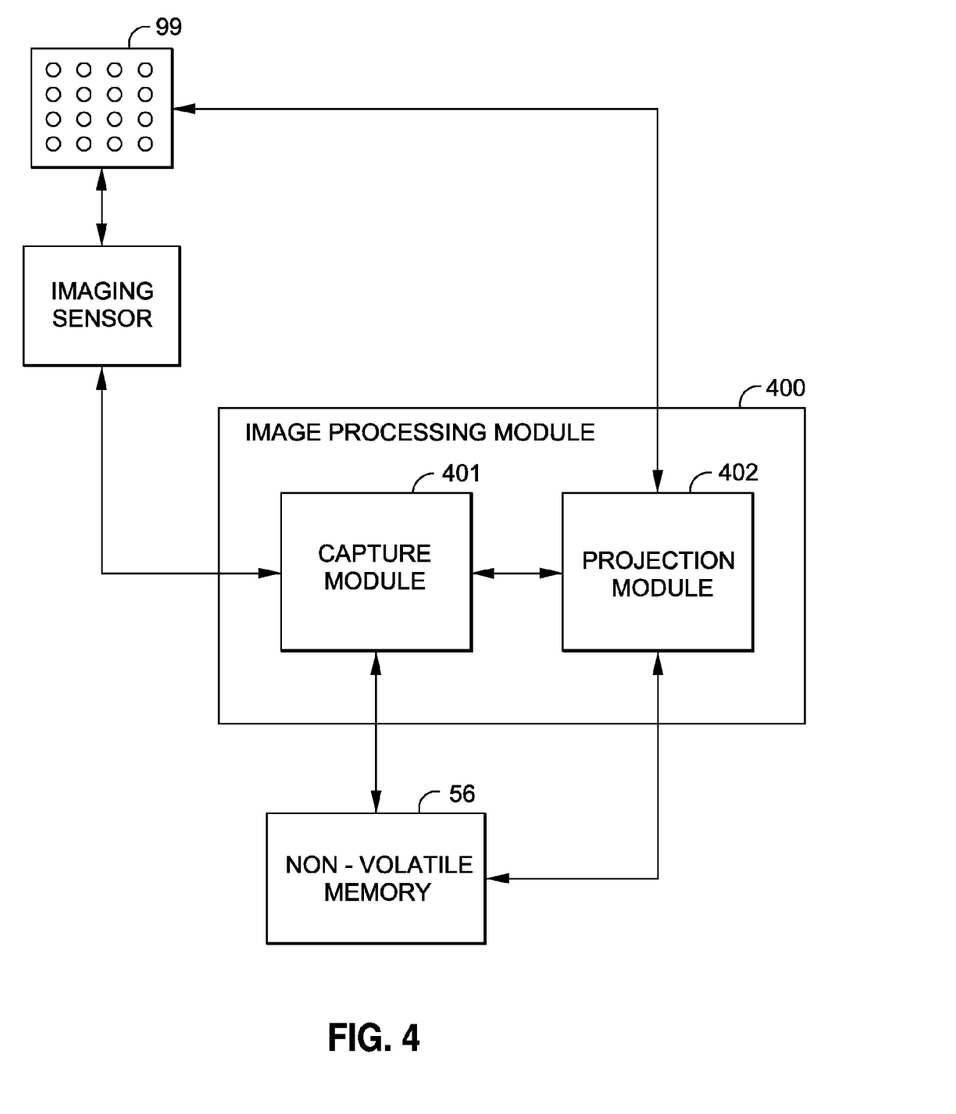
FIG. 4 is a view for explaining an image processing module according to one example embodiment.

FIG. 4 is a view for explaining an image processing module according to an example embodiment. As previously discussed with respect to FIG. 2B, image processing module 400 comprises computer-executable process steps stored on a non-transitory computer-readable storage medium, such as non-volatile memory 56. More or less modules may be used, and other architectures are possible.

As shown in FIG. 4, image processing module 400 includes at least capture module 401 and projection module 402. Capture module 401 captures multi-spectral image data with an image sensor of the image capture apparatus, such as imaging sensor 14. In this embodiment, image sensor 14 has a tunable spectral response and is tunable in accordance with a capture mask. Capture module 401 communicates with non-volatile memory 56 to store the multi-spectral image data, for example as image data 251 shown in FIG. 2B. Projection module 402 projects light-field information of a scene with light-field optics of the image capture apparatus. In particular, the light-field information is projected onto the image sensor. To that end, projection module 402 communicates with light-field gathering assembly 99, which in turn is connected to image sensor 14 to gather light-field information of a scene in a single capture operation.

Figure 5:
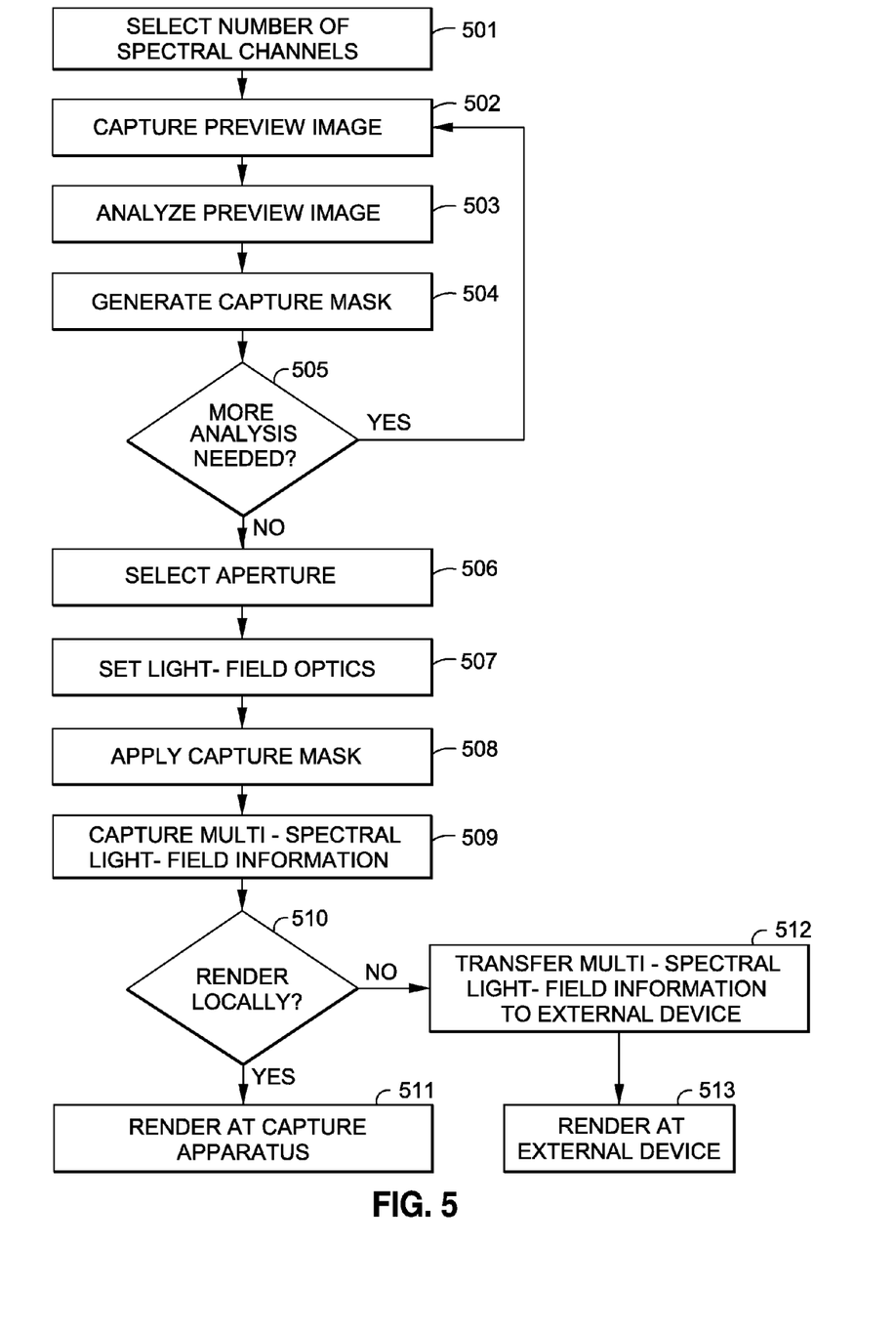
FIG. 5 is a flow diagram for explaining processing in the image capture device shown in FIG. 1 according to an example embodiment.

FIG. 5 is a flow diagram for explaining processing in the image capture device shown in FIG. 1 according to an example embodiment. In that regard, it should be understood that FIG. 5 is intended to provide a conceptual view of the nature of the processes performed. Thus, some steps in FIG. 5 are performed continuously, or the particular order and sequence of steps might change. For example, selection of an aperture could occur before selection of a number of spectral channels and generation of a capture mask.

Briefly, in FIG. 5, multi-spectral image data is captured with an image sensor of the image capture apparatus. The image sensor has a tunable spectral response and is tunable in accordance with a capture mask. Light-field information of a scene is projected onto the image sensor with light-field optics of the image capture apparatus.

In more detail, in step 501, a number of spectral channels is selected. The selected number of spectral channels are used in generation of a capture mask. Thus, if a user selects three spectral channels, then the capture mask will tune three channels for each pixel. For example, a user could select 3 (e.g., basic RGB), 5, 7, or another number of channels. The number of channels could be limited based on the hardware (i.e., the number of contacts). The selection also allows the user to configure the camera in accordance with picture quality. In particular, the quality of the captured image can decrease as the number of channels increases, as less energy is available for each channel.

The selection of a number of spectral channels could also be accomplished automatically, for example by the image capture apparatus itself, or by instructions from an external apparatus.

In step 502, a preview image is captured. In one embodiment, the preview imaging may be ongoing until the user selects to pause the image data of the scene, for example by a half-stroke of shutter button 310. Thus, the image capture apparatus is operable to capture a preview of the scene. The preview image is analyzed, to construct a capture mask based on the analysis of the preview image, and additionally to determine an aperture for the light-field optics based on the analysis of the preview image, as described below. In that regard, the preview image may reflect default values for the apertures of the light-field gathering unit, or may be generated to reflect updated aperture values for one or more regions selected and adjusted by the user.

In step 503, the preview image is analyzed to determine whether the tunable sensor can tune the capture parameters of the pixels to optimize for areas of a scene. In particular, the captured image can be analyzed to determine, among others, detail visibility, color balance, and whether exposure correction is necessary. For example, a scene might be taken under multiple illumination sources with different color temperature, such that the color balance has to be corrected for different parts of the image.

In that regard, capture parameters can be produced as a basis for generating a capture mask for the tunable image sensor 14. Such capture parameters can include, but are not limited to, amount of compensation necessary for color balance, signal attenuation or amplitude boosting for colors or areas of the image with corresponding image coordinates. For example, scenes captured under certain illuminations may lack vibrant color, and thus the voltages for those colors in the pixel can be adjusted to increased desired color amplitudes. Conversely, parameters can be calculated to discount certain illuminations or colors. Further details of the analysis and adjustments based thereon are described U.S. application Ser. No. 12/859,115, filed Aug. 18, 2010, titled "Image Capture With Identification Of Illuminant", by Francisco Imai, the contents of which are incorporated by reference herein.

In step 504, the capture mask is generated, to be applied to the image sensor 14 having tunable filters. Thus, after a user interface accepts a user designation of a number of spectral components as in step 501, the capture mask is constructed in accordance with the user designation. The capture mask is applied to the image sensor at the time of capture, so as to tune the spectral response of the image sensor to the number of spectral components designated by the user. The capture mask can be stored in non-volatile memory 56, for example as spatial masks 252. In such an embodiment, non-volatile memory 56 functions as a mask memory which stores the capture mask for application to the image sensor, so as to tune the spectral response of the image sensor 14.

The capture mask may comprise information reflecting multiple spatial masks, with one mask each for each channel of information output by image sensor 14. For example, each spatial mask might comprise an array of control parameters corresponding to pixels or regions of pixels in image sensor 14. In this regard, image sensor 14 may be comprised of a transverse field detector (TFD) sensor mentioned hereinabove. The spatial masks may correspond to voltage biases applied to control electrodes of the TFD sensor. The spectral responsivity of each pixel, or each region of plural pixels, is thus tunable individually and independently of other pixels or regions of pixels.

The pixel-by-pixel basis spatial electronic voltage capture mask can be generated to, for example, modulate the amplitude and spectral selectivity of image sensor 14 with tunable color sensitivities. The electronic mask can control amplitude and spectra tuning for each pixel. Specifically, compensation values for the voltages for each pixel can then be derived, and the compensation voltages can be stored in the capture mask for application to the tunable image sensor.

Other examples may be developed in accordance with the description herein for use of an imaging assembly which has a spectral response which is tunable in accordance with a capture parameter, such as an imaging assembly with an image sensor which has a tunable spectral response. Such examples may address color balancing, dynamic range adjustment, spectral imaging independently for several areas of the imaging frame with one capture after image analysis, and/or combinations thereof. Further examples of color rendering could include rendering a specific spectral band in the imaging (useful for medical, astronomical imaging, forensics) or a color encoding under a specific illumination (for example, rendering a sRGB image of the captured spectral scene under CIE D65 illuminant and 2 degree observer).

The capture mask can be configured to tune the image sensor to in accordance with more than three (3) spectral components, based on capture parameter 17. For example, if image sensor 14 can gather high-resolution spectral data, image sensor 14 outputs, for example, five or more channels of color information, such as a red-like channel, a green-yellow-like channel, a green-like channel, a blue-green-like channel, and a blue-like channel. In such an example, where image sensor 14 outputs five or more channels, capture parameter 17 may include, for example, a spatial mask DR for the red-like channel of information, a spatial mask DGY for the green-yellow-like channel of information, a spatial mask DG for the green-like channel of information, a spatial mask DBG for the blue-green-like channel of information and a spatial mask DB for the blue-like channel of information.

In step 505, there is a determination of whether more analysis scenes are needed. In particular, there are scenes whose physical values go beyond what can be captured by one single capture. In such cases, there may be the need to capture multiple images. Accordingly, the capture parameters may also include a flag signal that indicates if more analysis of scenes is needed, meaning that there are more corrections to be performed and further iterations of scene capture are warranted. If more analysis is necessary, a new capture mask can be generated, and another preview image can be captured. This iterative process continues until desired parameters for the capture mask are reached. If more scene captures are needed, the process proceeds to step 502 to capture another preview image. If there is no need for additional scene captures, the process proceeds to step 506.

In step 506, an aperture is selected for the light-field optics, based on the preview image. The aperture may be selected automatically by image capture device 100, by commands from an external device, or by a user, as discussed more fully below with respect to FIGS. 6A to 6C.

Figure 7:
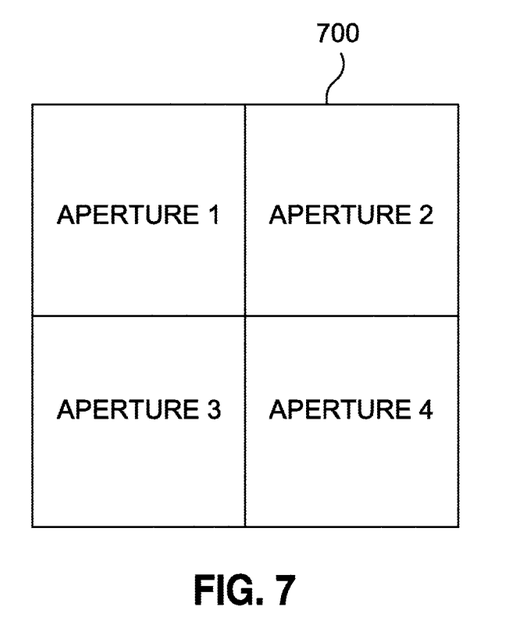
FIG. 7 is a view for explaining a super-pixel according to an example embodiment.

In that regard, control of aperture may be managed in terms of super-pixels. Each super-pixel is comprised of a group of pixels, each pixel (originally) having a different default aperture, as shown in FIG. 7. There is an initial default aperture selection for each super-pixel of the image, based on imaging auto-exposure.

The super-pixel could be of various sizes, e.g., 4 pixels, 9 pixels, 16 pixels or larger, but as the super-pixel becomes larger, resolution may decrease. Thus, ordinarily a 4-pixel super-pixel will be appropriate. Other geometries could be used for the super-pixel, such as triangular, hexagonal, and other polygonal pixel shapes. The super-pixels could be managed by, for example, a light-field spatial selection mask separate from the capture mask used for capture of spectral data. The super-pixel may be constructed by rearranging captured data. For example, due to the nature of some light-field gathering units, the pixels of the super-pixel may not actually be physically adjacent when captured, and are instead rearranged after capture.

The super-pixel reduces the overall amount of processing required, and thus conserves time and processing power. In particular, one aperture is applied to all of the pixels of the super-pixel in a selected region, as discussed more fully below. Thus, the processing occurs in "chunks", rather than individually for each individual pixel. In contrast, processing separate apertures for each individual pixel of an entire image could lead to significant decrease in processing speed.

As mentioned above, a single super-pixel includes four pixels, with each pixel initially having a different aperture. The apertures for each pixel of the super-pixel may be pre-defined in the hardware, defined by a manufacturer or user, or otherwise set at default values.

In step 506, however, there is a determination which aperture in the super-pixel should be selected for all pixels in the super-pixel in order to produce or approach a focus selected by the user.

In one example, a user might select a focus for one or more regions in the image, which in turn could determine the set apertures for each superpixel.

In this regard, FIG. 6A is a view for explaining display of an image by the image capture device shown in FIG. 1 according to one example embodiment. In particular, a rear view of image capture device 100 having image display unit 28 is provided in FIG. 6A. According to this example embodiment, a user interface which includes the preview image based on captured image data of a scene is displayed on the image display unit 28.

In some cases, image data captured by the image capture device 100 and displayed on the image display unit 28 includes regions where different focus adjustments are desired by the user. Accordingly, adjusting focus globally (e.g., by adjusting a single focus point) may result in certain areas of the image where the imaging property looks incorrect or not pleasing from the user's aesthetic point of view. Thus, according to the embodiment herein, the user is provided with the user interface to independently adjust different regions of the image.

FIG. 6B is a view for explaining acceptance of a designation of a region of interest according to one example embodiment. As shown in FIG. 6B, the preview image displayed on the image display unit 28 depicts an image divided into a plurality of regions. In particular, the preview image includes three regions. In one region of the preview image, a landscape of mountains in the background is displayed. In another region, the sun is displayed. In a third region, a body of water is displayed.

Multiple different methods of segmenting the image into regions are possible. In one example, RGB (or other color scheme) values are determined for each pixel in the preview image, and pixels having substantially the same RGB values (or within a certain range or tolerance) are determined to be included in the same ROI. Alternatively, the ROI can be actively determined. For example, when the user designates the ROI in the preview image, the image capture device can determine which pixels of the image which are included in the ROI. For example, a spatial filtering algorithm is executed to determine the edges of the ROI. Thus, the user "grabs" a region. In this example embodiment, if the user decides to adjust the imaging property for a designated ROI, the image is divided for the user to select and adjust the focus for the designated ROI. For example, if the user decides that the focus for the three different areas of the image should be adjusted, the image is divided into three regions of interest for the user to select and adjust the exposure values. Of course, any other suitable processes for dividing the image into regions can also be used. Additionally, the user may adjust the size of the regions relative to the image displayed.

As shown in FIG. 6C, image display unit 28 displays on the user interface an imaging property range of a selected region of interest. By manipulating the focus range as shown in FIG. 6C, the user effects the selection of the focus for the designated region of interest. After the user designates one region of interest and selects a target focus for the designated region, the user may then designate a different region on the image display unit 28. The focus selections may be stored in non-volatile memory, for example as focal point selections 253 in FIG. 2B. In one embodiment, ranges for all of the targeted foci to be adjusted are displayed on a single user interface. For example, the user interface displays slide bars representing focus ranges together with a slide bar representing a focus range. Alternatively, selection of targeted foci can be performed in a multi-step process, in which the user interface displays one or any combination of targeted foci to be adjusted.

The user interfaces depicted in FIGS. 6A to 6C are merely examples of user interfaces which can be displayed by the user interface according to this example embodiment. It should be understood that other types of suitable interfaces can also be displayed.

Returning to step 506, using the selected focusing parameter, system controller 50 may interpolate to select the aperture(s) of the super-pixel which corresponds most closely to the necessary aperture for the selected focus, and then apply that aperture to all of the pixels in the super-pixel, as well as all of the super-pixels in a region of interest. Thus, for the example super-pixel shown in FIG. 7, the image capture device may determine that "Aperture 4" provides the focus closest to the focus selected by the user (or the focus otherwise determined). Accordingly, the Aperture 4 value would be applied to all four pixels of the super-pixel.

The selected apertures may be stored in a light-field spatial selection mask which is independent from the capture mask used for the tunable spectral sensitivities. The light-field spatial selection mask can reflect the updated focus selected by the user for one or more regions, and can be updated and/or regenerated based on the user selections of foci. In addition, the light-field spatial selection mask can be stored in non-volatile memory 56, for example as part of spatial masks 252.

Further details of aperture selection can be found in U.S. patent application Ser. No. 12/886,337, filed Sep. 20, 2010, titled "Image Capture With Focus Adjustment", by Francisco Imai, the contents of which are incorporated by reference herein.

In step 507, the light-field optics are set according to the selected apertures. In particular, the light-field optics may be refocused to the apertures selected in step 506, in order to generate a focus closest to a desired focus. Thus, the light-field optics (or sections thereof, e.g., by adjusting the focusing distances of the mini-lenses) can be selectively focused and defocused for different regions to the selected apertures, to achieve or at least approximate the desired ranges of focus or degrees of sharpness.

In step 508, the capture mask generated in step 504 is applied to image sensor 14, so as to tune the spectral response of the image sensor. In particular, in the embodiment shown in FIG. 2A, image sensor 14 is tunable in accordance with a capture parameter 17. The precise nature of the spectral responsivity of image sensor 14 is controlled via capture parameter 17, which are in turn reflected in the capture mask.

Thus, the capture mask constructed by the preview analysis unit is applied to the image sensor and the light-field optics are set to the aperture determined by the preview analysis unit, prior to capture of an image of the scene.

In step 509, the image capture device captures multi-spectral light-field information, using the image sensor to which the capture mask is applied, and using the light-field optics set to the selected apertures. In that regard, non-volatile memory 56 or another memory may function as an image memory for storing multi-spectral light-field information captured by the image sensor, e.g., as image data 251.

In this regard, it might be possible to reduce the amount of information ultimately saved in the memory based on selection of an aperture, and thus to conserve memory space. For example, assume a user selects a focal point which emphasizes the foreground of a scene, and an aperture is selected in step 506 which best corresponds to such focus. The image capture apparatus could potentially discard any data which does not correspond to the selected aperture, and thereby reduce memory usage. On the other hand, discarding such data might reduce or even eliminate the user's ability to refocus the image differently, for example to focus on a different object in the background of the scene in the future.

In step 510, there is a determination of whether to render the image locally or externally. For example, the image capture apparatus may include an interface (e.g., communication circuit 110) for transfer of the multi-spectral light-field information to an external image synthesis host, and if desired, the image synthesis host can process the multi-spectral light-field information into a synthetic image by applying one or more of a desired focal point, a desired color rendering, a desired focal depth, and a desired perspective. In that regard, the synthetic image may be comprised of tri-stimulus color values with three (3) or more spectral components.

If the user desires to render locally, the process proceeds to step 511 to render the image at the image capture device. On the other hand, if the user desires to render externally, the multi-spectral light-field information is transferred to an external device in step 512, and is rendered at the external device at step 513.

According to other embodiments contemplated by the present disclosure, example embodiments may include a computer processor such as a single core or multi-core central processing unit (CPU) or micro-processing unit (MPU), which is constructed to realize the functionality described above. The computer processor might be incorporated in a stand-alone apparatus or in a multi-component apparatus, or might comprise multiple computer processors which are constructed to work together to realize such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. For these purposes, access to the non-transitory computer-readable storage medium may be a local access such as by access via a local memory bus structure, or may be a remote access such as by access via a wired or wireless network or Internet. The computer processor(s) may thereafter be operated to execute the computer-executable program or program steps to perform functions of the above-described embodiments.

According to still further embodiments contemplated by the present disclosure, example embodiments may include methods in which the functionality described above is performed by a computer processor such as a single core or multi-core central processing unit (CPU) or micro-processing unit (MPU). As explained above, the computer processor might be incorporated in a stand-alone apparatus or in a multi-component apparatus, or might comprise multiple computer processors which work together to perform such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. Access to the non-transitory computer-readable storage medium may form part of the method of the embodiment. For these purposes, access to the non-transitory computer-readable storage medium may be a local access such as by access via a local memory bus structure, or may be a remote access such as by access via a wired or wireless network or Internet. The computer processor(s) is/are thereafter operated to execute the computer-executable program or program steps to perform functions of the above-described embodiments.

The non-transitory computer-readable storage medium on which a computer-executable program or program steps are stored may be any of a wide variety of tangible storage devices which are constructed to retrievably store data, including, for example, any of a flexible disk (floppy disk), a hard disk, an optical disk, a magneto-optical disk, a compact disc (CD), a digital versatile disc (DVD), micro-drive, a read only memory (ROM), random access memory (RAM), erasable programmable read only memory (EPROM), electrically erasable programmable read only memory (EEPROM), dynamic random access memory (DRAM), video RAM (VRAM), a magnetic tape or card, optical card, nanosystem, molecular memory integrated circuit, redundant array of independent disks (RAID), a nonvolatile memory card, a flash memory device, a storage of distributed computing systems and the like. The storage medium may be a function expansion unit removably inserted in and/or remotely accessed by the apparatus or system for use with the computer processor(s).

This disclosure has provided a detailed description with respect to particular representative embodiments. It is understood that the scope of the appended claims is not limited to the above-described embodiments and that various changes and modifications may be made without departing from the scope of the claims.

What is claimed is:

1. An image capture apparatus comprising:
   an image sensor which has a tunable spectral response and which is tunable in accordance with a capture mask to capture multi-spectral image data;
   light-field optics arranged to project light-field information of a scene onto the image sensor; and
   a user interface which accepts a user designation of a number of spectral components, wherein the capture mask is constructed in accordance with the user designation and is applied to the image sensor so as to tune the spectral response of the image sensor to the number of spectral components designated by the user.

2. The image capture apparatus according to claim 1, further comprising a mask memory which stores the capture mask for application to the image sensor, so as to tune the spectral response of the image sensor.

3. The image capture apparatus according to claim 2, wherein the capture mask is configured to tune the image sensor to capture more than three (3) spectral components.

4. The image capture apparatus according to claim 1, wherein the light-field optics comprise multi-aperture optics.

5. The image capture apparatus according to claim 1, wherein the image capture apparatus is operable to capture a preview of the scene, and further comprising:
   a preview analysis unit constructed to analyze the preview image, to construct the capture mask based on the analysis of the preview image, and to determine an aperture for the light-field optics based on the analysis of the preview image;
   wherein the capture mask constructed by the preview analysis unit is applied to the image sensor and the light-field optics are set to the aperture determined by the preview analysis unit, prior to capture of an image of the scene.

6. The image capture apparatus according to claim 1, further comprising an image memory for storing multi-spectral light-field information captured by the image sensor.

7. The image capture apparatus according to claim 6, further comprising an interface for transfer of the multi-spectral light-field information to an external image synthesis host, wherein the image synthesis host processes the multi-spectral light-field information into a synthetic image by applying one or more of a desired focal point, a desired color rendering, a desired focal depth, and a desired perspective.

8. The image capture apparatus according to claim 7, wherein the synthetic image is comprised of tri-stimulus color values with three (3) spectral components.

9. A method of image capture for an image capture apparatus, comprising:
   capturing multi-spectral image data with an image sensor of the image capture apparatus, wherein the image sensor has a tunable spectral response and is tunable in accordance with a capture mask;
   projecting light-field information of a scene onto the image sensor with light-field optics of the image capture apparatus; and
   providing a user interface which accepts a user designation of a number of spectral components, wherein the capture mask is constructed in accordance with the user designation and is applied to the image sensor so as to tune the spectral response of the image sensor to the number of spectral components designated by the user.

10. The method according to claim 9, further comprising storing the capture mask in a mask memory for application to the image sensor, so as to tune the spectral response of the image sensor.

11. The method according to claim 10, wherein the capture mask is configured to tune the image sensor to capture more than three (3) spectral components.

12. The method according to claim 9, wherein the light-field optics comprise multi-aperture optics.

13. The method according to claim 9, further comprising:
   capturing a preview of the scene;
   analyzing the preview image;
   constructing a capture mask based on the analysis of the preview image; and
   determining an aperture for the light-field optics based on the analysis of the preview image,
   wherein the constructed capture mask is applied to the image sensor and the light-field optics are set to the aperture determined in the preview analysis, prior to capture of an image of the scene.

14. The method according to claim 9, wherein the image capture apparatus comprises an image memory for storing multi-spectral light-field information captured by the image sensor.

15. The method according to claim 14, wherein the image capture apparatus further comprises an interface for transfer of the multi-spectral light-field information to an external image synthesis host, and wherein the image synthesis host processes the multi-spectral light-field information into a synthetic image by applying one or more of a desired focal point, a desired color rendering, a desired focal depth, and a desired perspective.

16. The method according to claim 15, wherein the synthetic image is comprised of tri-stimulus color values with three (3) spectral components.

17. A non-transitory computer-readable storage medium storing computer-executable process steps for performing a method of image capture for an image capture apparatus, the method comprising:
   capturing multi-spectral image data with an image sensor of the image capture apparatus, wherein the image sensor has a tunable spectral response and which is tunable in accordance with a capture mask;

projecting light-field information of a scene with light-field optics of the image capture apparatus, wherein the light-field information is projected onto the image sensor; and providing a user interface which accepts a user designation of a number of spectral components, wherein the capture mask is constructed in accordance with the user designation and is applied to the image sensor so as to tune the spectral response of the image sensor to the number of spectral components designated by the user.

18. The computer-readable storage medium according to claim 17, wherein the method further comprises storing the capture mask in a mask memory for application to the image sensor, so as to tune the spectral response of the image sensor.

19. The computer-readable storage medium according to claim 18, wherein the capture mask is configured to tune the image sensor to capture more than three (3) spectral components.

20. The computer-readable storage medium according to claim 17, wherein the light-field optics comprise multi-aperture optics.

21. The computer-readable storage medium according to claim 17, wherein the method further comprises:

capturing a preview of the scene;
analyzing the preview image;
constructing a capture mask based on the analysis of the preview image; and
determining an aperture for the light-field optics based on the analysis of the preview image,
wherein the constructed capture mask is applied to the image sensor and the light-field optics are set to the aperture determined in the preview analysis, prior to capture of an image of the scene.

22. The computer-readable storage medium according to claim 17, wherein the image capture apparatus comprises an image memory for storing multi-spectral light-field information captured by the image sensor.

23. The computer-readable storage medium according to claim 22, wherein the image capture apparatus further comprises an interface for transfer of the multi-spectral light-field information to an external image synthesis host, and wherein the image synthesis host processes the multi-spectral light-field information into a synthetic image by applying one or more of a desired focal point, a desired color rendering, a desired focal depth, and a desired perspective.

24. The computer-readable storage medium according to claim 23, wherein the synthetic image is comprised of tri-stimulus color values with three (3) spectral components.

* * * * *